United States Patent
Krish et al.

(10) Patent No.: US 10,001,030 B2
(45) Date of Patent: Jun. 19, 2018

(54) SYSTEMS AND METHODS FOR LUBRICATING BEARINGS OF ROTATING EQUIPMENT IN GAS PROCESSING SYSTEMS

(71) Applicant: Energy Recovery, Inc., San Leandro, CA (US)

(72) Inventors: Prem Krish, Foster City, CA (US); Jeremy Grant Martin, Oakland, CA (US)

(73) Assignee: ENERGY RECOVEY, INC., San Leandro, CA (US)

( * ) Notice: Subject to any disclaimer, the term of this patent is extended or adjusted under 35 U.S.C. 154(b) by 847 days.

(21) Appl. No.: 14/504,198

(22) Filed: Oct. 1, 2014

(65) Prior Publication Data
US 2015/0211384 A1    Jul. 30, 2015

Related U.S. Application Data

(60) Provisional application No. 61/861,851, filed on Aug. 2, 2013.

(51) Int. Cl.
*B01D 53/14* (2006.01)
*F01D 25/22* (2006.01)
(Continued)

(52) U.S. Cl.
CPC .............. *F01D 25/22* (2013.01); *B01D 53/14* (2013.01); *B01D 53/1418* (2013.01); *B01D 53/1425* (2013.01); *B01D 53/1456* (2013.01); *B01D 53/1462* (2013.01); *B01D 53/1493* (2013.01); *B01D 53/78* (2013.01); *C10M 173/00* (2013.01); *F02C 6/12* (2013.01); *F02C 7/06* (2013.01); *F04D 13/04* (2013.01);
(Continued)

(58) Field of Classification Search
CPC ............ B01D 53/1418; B01D 53/1425; B01D 53/1456; B01D 53/1462; B01D 53/1493; B01D 53/78; F01D 25/22; F02C 6/12; F02C 7/06; F04D 29/061; F05D 2260/98
See application file for complete search history.

(56) References Cited

U.S. PATENT DOCUMENTS 2,600,743 A    6/1952    Ebner
3,233,880 A    2/1966    Podbielniak
(Continued)

FOREIGN PATENT DOCUMENTS

EP    0878615 A2    11/1998

OTHER PUBLICATIONS

PCT International Search Report and Written Opinion of PCT/162014/065025 dated Jan. 23, 2015.
(Continued)

*Primary Examiner* — Jason M Greene
(74) *Attorney, Agent, or Firm* — Fletcher Yoder, P.C.

(57) ABSTRACT

A method includes treating a process fluid of a gas processing system to create a treated process fluid and pressurizing the treated process fluid to a predetermined pressure using a pump of the gas processing system. The method also includes routing the treated process fluid at the predetermined pressure to a rotating assembly of the gas processing system and lubricating a bearing of the rotating assembly using the treated process fluid at the predetermined pressure.

19 Claims, 7 Drawing Sheets

(51) Int. Cl.
*F02C 7/06* (2006.01)
*F02C 6/12* (2006.01)
*C10M 173/00* (2006.01)
*B01D 53/78* (2006.01)
*F04D 29/06* (2006.01)
*F04D 13/04* (2006.01)
*B01D 53/00* (2006.01)

(52) U.S. Cl.
CPC ....... *F04D 29/061* (2013.01); *B01D 53/002* (2013.01); *B01D 2252/204* (2013.01); *B01D 2257/304* (2013.01); *B01D 2257/504* (2013.01); *B01D 2257/80* (2013.01); *F05D 2210/12* (2013.01); *F05D 2220/40* (2013.01); *F05D 2260/98* (2013.01)

(56) References Cited

U.S. PATENT DOCUMENTS

| | | | |
|---|---|---|---|
| 3,548,568 A | 12/1970 | Carlson et al. | |
| 3,812,654 A | 5/1974 | Brown | |
| 4,044,561 A * | 8/1977 | Hohn | F01D 25/22 277/432 |
| 4,049,972 A * | 9/1977 | Crowdy | F01D 25/22 290/52 |
| 4,894,993 A * | 1/1990 | Assaf | F01K 3/00 60/641.8 |
| 5,409,576 A * | 4/1995 | Tleimat | B01D 1/225 159/11.1 |
| 5,499,693 A * | 3/1996 | Widenhorn | B01D 35/12 184/6.24 |
| 2007/0007771 A1* | 1/2007 | Biddle | F01D 25/22 290/7 |
| 2008/0245082 A1* | 10/2008 | Sishtla | F04D 29/058 62/84 |
| 2011/0015456 A1* | 1/2011 | Broadbent | B01D 53/1425 585/16 |
| 2012/0037488 A1* | 2/2012 | Zebuhr | B01D 1/225 203/4 |

OTHER PUBLICATIONS

Examination Report for GB Application No. 2,919,807 dated Mar. 28, 2017; 3 pgs.

* cited by examiner

SYSTEMS AND METHODS FOR LUBRICATING BEARINGS OF ROTATING EQUIPMENT IN GAS PROCESSING SYSTEMS

CROSS-REFERENCE TO RELATED APPLICATION

This application claims priority to and benefit of U.S. Provisional Patent Application No. 61/861,851, entitled "IMPROVED METHOD FOR OPERATING ROTATING EQUIPMENT WITH PROCESS LUBRICATED BEARINGS IN GAS SEPARATION PROCESSES," filed on Aug. 2, 2013, which is hereby incorporated by reference in its entirety for all purposes.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The subject matter disclosed herein relates to gas processing, and, more particularly, to systems and methods for using a process fluid to lubricate bearings of rotating equipment during gas processing.

Natural gas is a naturally occurring hydrocarbon gas mixture that may be combusted to provide energy or used as a chemical feedstock in the manufacture of plastics and other organic chemicals. Virgin natural gas (e.g., untreated natural gas), as it emerges from natural geologic reservoirs, contains varying amounts of sour gases, particularly carbon dioxide and hydrogen sulfide, also referred to as acid gases. Carbon dioxide reduces the calorific value of the natural gas, and hydrogen sulfide may transform into sulfur dioxide, sulfur trioxide, and/or sulfuric acid. One method for removing these sour gas components from virgin natural gas is to combine it with water and amine in a high pressure environment (e.g., in a contactor). This process allows the separation of the high quality natural gas from the sour gases.

Large amounts of energy may be expended in pressurizing the amine solutions used in the natural gas separation process, which may be lost (e.g., not recovered) when the sour gases are stripped from the amine solutions. A turbocharger, which includes a turbine section and a pump section, may be used to recover at least a portion of the energy from the amine solution exiting the contactor. Turbochargers generally rotate at high speeds, and as such, bearings of the turbocharger are lubricated to reduce wear of the turbocharger and to cool the turbocharger. For example, the turbocharger may be fitted with external oil lubricated bearings or process fluid lubricated bearings. However, oil lubricated bearings may increase the cost and complexity of the process as compared to process fluid lubricated bearings and may require dynamic shaft seals for proper implementation.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
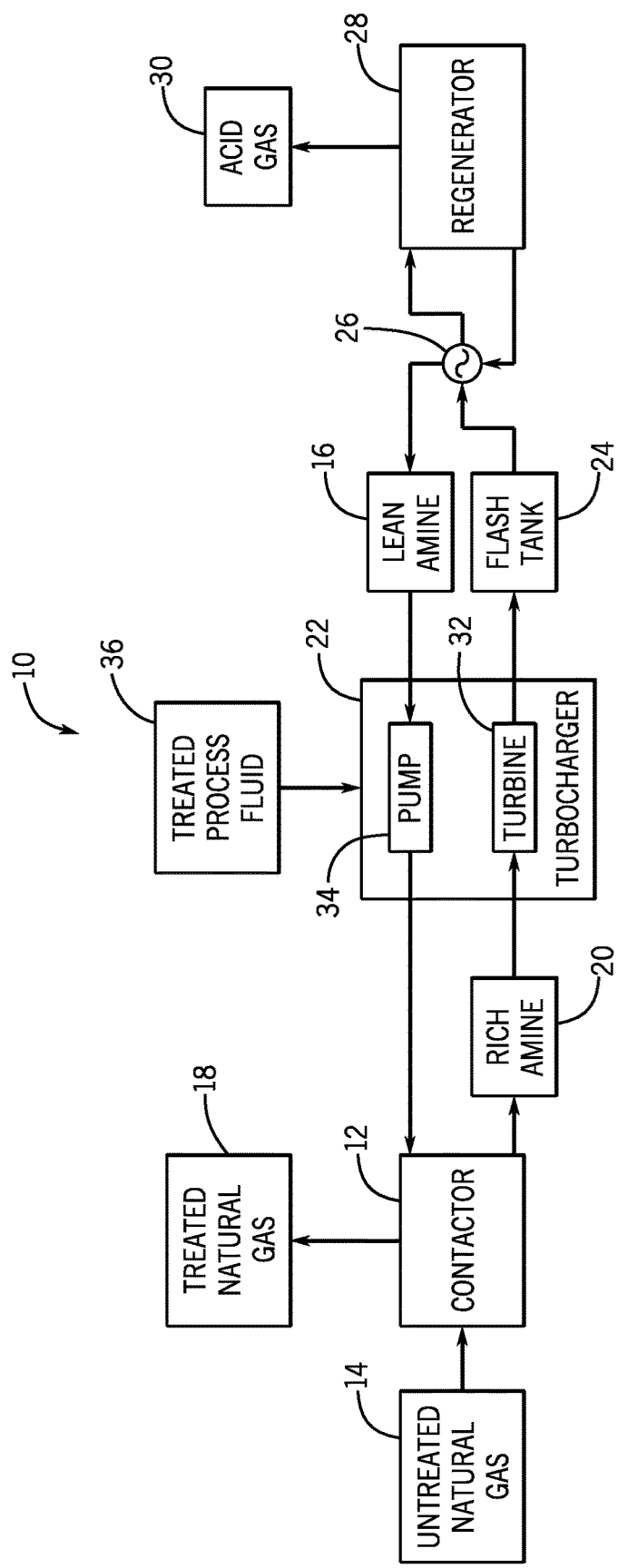
FIG. 1 is a schematic diagram of an embodiment of a gas processing system using a turbocharger and a treated process fluid for lubricating bearings of the turbocharger, in accordance with an embodiment.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments relate generally to gas processing, and particularly to systems and methods for using a process fluid to lubricate bearings of rotating equipment during gas processing. For example, a gas processing system, such as an amine gas processing system, may include a contactor that removes an acid gas from an untreated natural gas (e.g., virgin natural gas) using an amine in a lean amine stream, thereby generating treated natural gas (e.g., sweet gas) and a rich amine stream. The treated natural gas may be combusted to provide energy or used as a chemical feedstock. The amine gas processing system may also include a regenerator that regenerates the amine in the rich amine stream, thereby generating the lean amine stream and the acid gas.

The amine gas processing system may also include a rotating assembly, such as a turbocharger that transfers the rich amine stream from the contactor to the regenerator and transfers the lean amine stream from the regenerator to the contactor. In particular, the turbocharger may include a turbine section that receives a high pressure rich amine stream and a pump section that receives a low pressure lean amine stream. The turbine section may convert the hydraulic energy of the high pressure rich amine stream into mechanical energy, and the turbine section may power the pump section that pressurizes the low pressure lean amine stream.

The bearings of the turbocharger may be lubricated using a treated process fluid. In particular, various process fluids of the amine gas processing system may be treated and used as a lubricant for the turbocharger. In certain embodiments, one or more pieces of machinery or equipment from the gas processing system may be used as a source of the process fluid, which may then be treated and used as a lubricant for the turbocharger. For example, the process fluid may include a slip-stream, make-up water, condensate reflux, solvent (e.g., replacement solvent), aqueous solutions, or any other suitable process fluid. In certain embodiments, the process fluid may exclude oils and other conventional lubricants. Additionally, the process fluid may be treated using any suitable treatment steps. For example, in some embodiments, the process fluid may be treated by filtering the process fluid to remove particulates, corrosive materials, abrasive materials, and/or chemical contaminants (e.g., entrained hydrocarbons or surface-active compounds), exposing the process fluid to radiation (e.g., to kill bacteria), demineralization, providing the process fluid to an ion exchange column to remove certain ions, condensing the process flow, distilling the process flow, providing a chemical treatment, providing the process flow to absorption columns, providing temperature control (e.g., heat or cool), using flash tanks, and/or pH balancing.

Use of such embodiments of the gas processing system that include the turbocharger and the treated process flow lubricated bearings may provide several advantages compared to other amine gas processing systems that lack the turbocharger and the process flow lubricated bearings. For example, the amount of energy expended in pressurizing the rich amine stream in the disclosed embodiments may be significantly reduced by using the turbocharger, thereby reducing the carbon footprint of the amine gas processing system while simultaneously reducing the operating cost through a reduction in electrical power consumption. In addition, as discussed in detail below, the wear on the turbocharger may be reduced by using the treated process flow lubricated bearings. Further, the cost and complexity of the process may be reduced by using the treated process flow as a lubricant as compared to providing an external oil lubrication system.

FIG. 1 is a schematic diagram of an embodiment of a gas processing system 10 that may be used for natural gas processing. While the illustrated embodiment of the gas processing system 10 relates to an amine gas processing system, it should be appreciated that the present embodiments are not limited to amine gas processing and may be used for any suitable gas processing system. As shown in FIG. 1, a contactor 12 receives an untreated natural gas 14 (e.g., virgin natural gas), for example, at the bottom of the contactor 12. A lean amine stream 16 (e.g., a liquid) may be fed to the top of the contactor 12. As the untreated natural gas 14 moves upwards in the contactor 12, the natural gas 14 makes intimate contact with the down-flowing lean amine 16. As a result of this interaction within the contactor 12, the sour gases (e.g., acid gases) in the untreated natural gas 14 leave the gas phase stream and enter the liquid phase amine solution stream. Thus, a treated natural gas 18 (e.g., sweet gas) substantially free of the sour gases may leave through the top of the contactor 12.

The untreated natural gas 14 may enter the contactor 12 at pressures up to approximately 8,270 kPa and at a temperature of approximately 30 degrees Celsius. Throughout the following discussion, the term "high pressure" may refer to pressures associated with operation of the contactor 12 (e.g., up to approximately 6,895 kPa, 7,585 kPa, or 8,270 kPa). The lean amine 16 may enter the contactor 12 at temperatures between approximately 3 and 20 degrees Celsius, 4 and 15 degrees Celsius, or 5 and 12 degrees Celsius greater than the inlet temperature of the untreated natural gas 14 to help reduce or prevent condensation of heavier hydrocarbons from the untreated natural gas 14. Because of the exothermicity of the sour gas absorption reactions, the amine solution heats up within the contactor 12 and a high pressure rich amine stream 20, laden with sour gas, may leave the bottom of the contactor 12 at temperatures approaching approximately 60 degrees Celsius.

The exiting high pressure rich amine stream 20 then enters a turbocharger 22, which reduces the pressure of the rich amine stream 20 to a low pressure (e.g., between approximately 475 kPa and 730 kPa, 500 kPa and 715 kPa, or 515 kPa and 690 kPa). The low-pressure rich amine stream 20 is then routed by the turbocharger 22 through a flash tank 24, where any hydrocarbon gases are allowed to flash off and be recovered, and then to a rich/lean heat exchanger 26 and onwards to a regenerator 28, where the sour gases are stripped from the rich amine 20 through the application of heat. Thus, the rich/lean heat exchanger 26 is used to transfer heat from the lean amine 16 leaving the regenerator 28 to the low pressure rich amine 20 entering the regenerator 28. Acid gases 30 (e.g., sour gases) leave the top of the regenerator 28 after being released from the amine solution stream as a result of heating in the regenerator 28. The lean amine 16 exits the regenerator 28 at low pressure (e.g., between approximately 475 kPa and 730 kPa, 500 kPa and 715 kPa, or 515 kPa and 690 kPa) and passes through the rich/lean heat exchanger 26 and enters the turbocharger 22. Throughout the following discussion, the term "low pressure" may refer to pressures associated with operation of the regenerator 28 (e.g., between approximately 475 kPa and 730 kPa, 500 kPa and 715 kPa, or 515 kPa and 690 kPa). Further, it should be appreciated that the turbocharger 22 is merely provided as an example and the present techniques may be implemented using any suitable rotating equipment.

The turbocharger 22 may increase the pressure of the lean amine stream 16 to a high pressure (e.g., contactor pressure). The turbocharger 22 includes a turbine 32 and a pump 34. It should be noted that the turbocharger 22 is one example of a rotating assembly that may be used with the present techniques and any suitable rotating assembly may be used. The turbine 32 may convert the hydraulic energy of the high pressure rich amine stream 20 into mechanical energy that may be used by the pump 34 to pressurize the low pressure lean amine stream 16. As such, in powering the turbine 32, the high pressure rich amine stream 20 loses a portion of its hydraulic energy and exits the turbocharger 22 at a low pressure, while the amine stream 16 enters the pump 34 at a low pressure and exits the turbocharger 22 at a high pressure. In some embodiments, the turbocharger 22 may increase the pressure of the lean amine stream 16 up to approximately 6,895 kPa, 7,585 kPa, or 8,270 kPa. As will be described in more detail below, in certain embodiments, a high pressure pump may be used to partially pressurize the lean amine stream 16. That is, in some embodiments, the turbocharger 22 in combination with a high pressure pump may pressurize the lean amine stream 16 to a desired high pressure (e.g., contactor pressure).

Additionally, the gas processing system 10 includes a treated process fluid stream 36 that may be used to lubricate bearings of the turbocharger 22. As noted above, some process fluids may increase the wear of the turbocharger 22 due to particulates in the process fluid and/or the chemical or physical properties of the process fluid. As such, some process fluids of the gas separation processing system 10 may not be suitable for lubricating the bearings of the turbocharger 22. Accordingly, in some embodiments, treated process fluid stream 36 may be a process fluid used in the gas processing system 10 that is subjected to at least one treatment step to remove particulates from the process fluid and/or to alter the chemical and/or physical properties of the process fluid. For example, as noted above, the process fluid may be routed from one or more pieces of machinery or equipment of the gas processing system 10, and the process fluid may include a slip-stream, make-up water, condensate reflux, solvent (e.g., replacement solvent), aqueous solutions, or any other suitable process fluid. In certain embodiments, the process fluid may exclude oils and other conventional lubricants. Additionally, the process fluid may be treated using any suitable treatment steps. For example, the at least one treatment step may include filtering the process fluid to remove particulates, corrosive materials, abrasive materials, and/or chemical contaminants (e.g., entrained hydrocarbons or surface-active compounds), exposing the process fluid to radiation (e.g., to kill bacteria), demineralization, providing the process fluid to an ion exchange column to remove certain ions, condensing the process flow, distilling the process flow, providing a chemical treatment, providing the process flow to absorption columns, providing temperature control (e.g., heat or cool), using flash tanks, acid gas removal, and/or pH balancing.

In some embodiments, the treated process fluid stream 36 may be a treated slip-stream (e.g., a slip-stream separated from the lean amine stream 16 or the rich amine stream 20). For example, slip-streams may be between approximately 2 percent and 20 percent of the bulk flow (e.g., the lean amine stream 16 or the rich amine stream 20) and may be treated and returned to the bulk flow to maintain the cleanliness of the flow. Accordingly, a portion of the treated slip-stream may be routed to the turbocharger 22 to lubricate and cool the turbocharger 22 rather than returning to the bulk flow. In other embodiments, the treated process fluid 36 may be make-up water. Make-up water may be demineralized water that is added to compensate for water that is lost in a stream of the gas processing system 10 (e.g., in the treated natural gas 18 leaving the contactor 12). In other embodiments, the treated process fluid 36 may be condensate reflux. For example, steam exiting the regenerator 28 may be condensed and separated from the acid gas 30 to create condensate reflux, and the condensate reflux may be used to lubricate the turbocharger 22. In some embodiments, the treated process fluid 36 may be replacement fresh solvent (e.g., fresh lean amine 16). For example, replacement fresh solvent may be used to replace lost solvent, and a portion of the replacement fresh solvent may be used to lubricate the turbocharger 22. Further, in certain embodiments, the treated process fluid 36 may include two or more treated process fluids. By way of example, in one embodiment, a treated slip-stream and make-up water may be used as the treated process fluid 36 to lubricate and cool the turbocharger 22.

Figure 2:
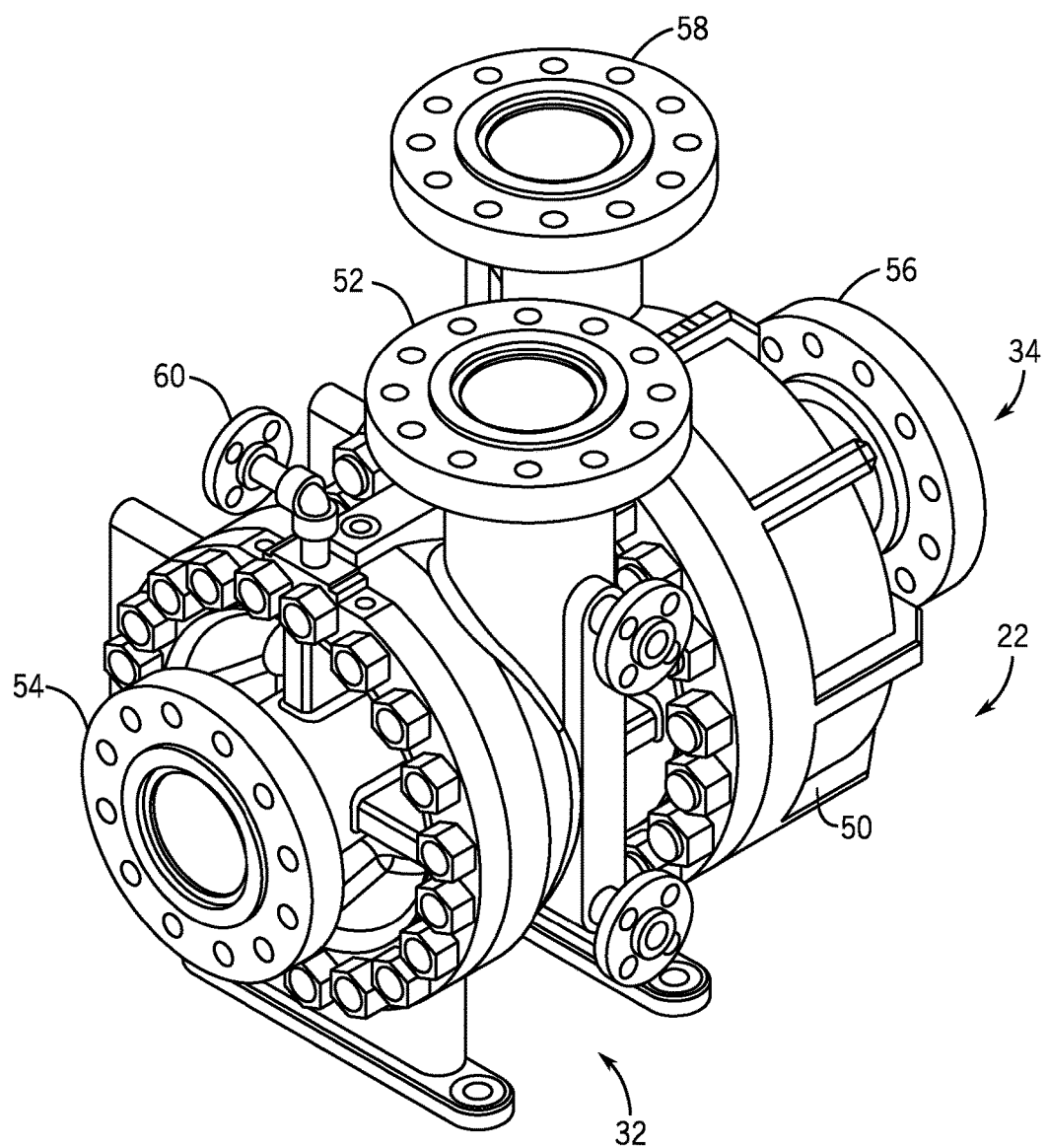
FIG. 2 is a perspective view of an embodiment of the turbocharger of FIG. 1, in accordance with an embodiment.

FIG. 2 illustrates a perspective view of an embodiment of the turbocharger 22 including a housing 50 that houses the turbine 32 (e.g., a turbine section) and the pump 34 (e.g., a pump section). In certain embodiments, the turbine 32 may be a high-speed Francis turbine and the pump 34 may be a centrifugal pump. The turbocharger 22 includes a turbine inlet 52, which may be configured to receive the rich amine stream 18 at high pressure, and a turbine outlet 54, which may be configured to output the rich amine stream 18 at low pressure. The turbocharger 22 also includes a pump inlet 56, which may be configured to receive the lean amine stream 16 at low pressure, and a pump outlet 58, which may be configured to output the lean amine stream 16 at high pressure. Additionally, the turbocharger 22 includes at least one bearing lubricant inlet 60, which may be configured to receive the treated process fluid 36. The bearing lubricant inlet 60 may be disposed proximate to the turbine 32, as illustrated, or in any other suitable location about the housing 50.

Figure 3:
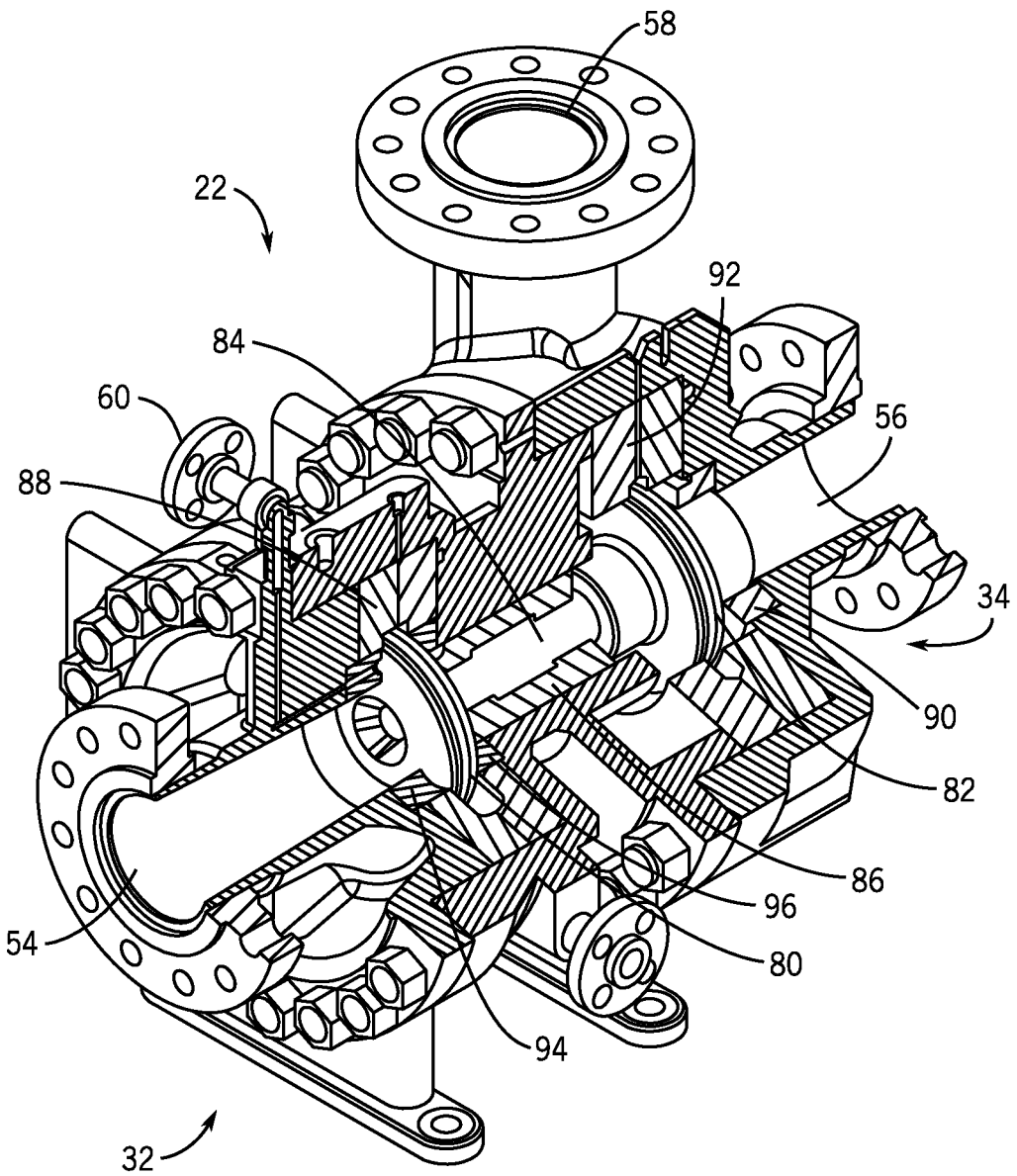
FIG. 3 is a cutaway perspective view of an embodiment of the turbocharger of FIG. 1, in accordance with an embodiment.

FIG. 3 illustrates a partial cross-sectional perspective view of an embodiment of the turbocharger 22. As illustrated, the turbocharger 22 includes a turbine runner 80 and a pump impeller 82 that are connected by a common rotatable shaft 84, which may be supported by a central bearing 86 (e.g., a radial bearing). In operation, the rich amine stream 16 at high pressure enters the turbine inlet 52 and is directed to the turbine volute formed by the turbine volute insert 88. The rich amine stream 16 is then directed from the turbine volute to the pump impeller 82, which may be supported by a pump wear ring 90. The turbine 32 decreases the pressure on the rich amine stream 18 that enters the turbine inlet 52 and the rich amine stream 18 is discharged through the turbine outlet 54. The mechanical energy generated by the rotation of the turbine 32 is transmitted through the shaft 84 to the pump impeller 82 and causes the vanes of the pump impeller 82 to rotate. Additionally, the lean amine stream 16 at low pressure enters the pump inlet 56 and enters the pump impeller 82. The rotating vanes of the pump impeller 82 cause the lean amine stream 16 to accelerate. The lean amine stream 16 then exits the pump impeller 82 at high velocity and enters the pump volute formed by the pump volute insert 92. The pump volute converts the kinetic energy of the lean amine stream 16 into pressure. As such, the lean amine stream 16 exits through the pump outlet 58 at high pressure.

The rotation of the turbine 32 and the shaft 84 may create frictional forces. Accordingly, the turbocharger 22 may include a thrust bearing 94 and a touchdown bearing 96 (e.g., a reverse thrust bearing) that support the turbine runner 80 and minimize friction. Further, as illustrated, the bearing lubricant inlet 60 terminates in a passageway 98 directing the treated process fluid 36 to the thrust bearing 94 and the touchdown bearing 96 to lubricate and cool the thrust bearing 94 and the touchdown bearing 96 to reduce wear and minimize or avoid increases in temperature within the turbocharger 22 due to friction. However, in other embodiments, independent lubricant paths may be used to provide the treated process fluid 36 to the thrust bearing 94 and the touchdown bearing 96. It should be appreciated that in other embodiments, the treated process fluid 36 may also be used to lubricate and cool the center bearing 86, the turbine runner 80, gears of the turbocharger 2, sliding seals or interfaces between rotating and stationary parts of the turbocharger 22, or any other suitable components of the turbocharger 22.

Figure 4:
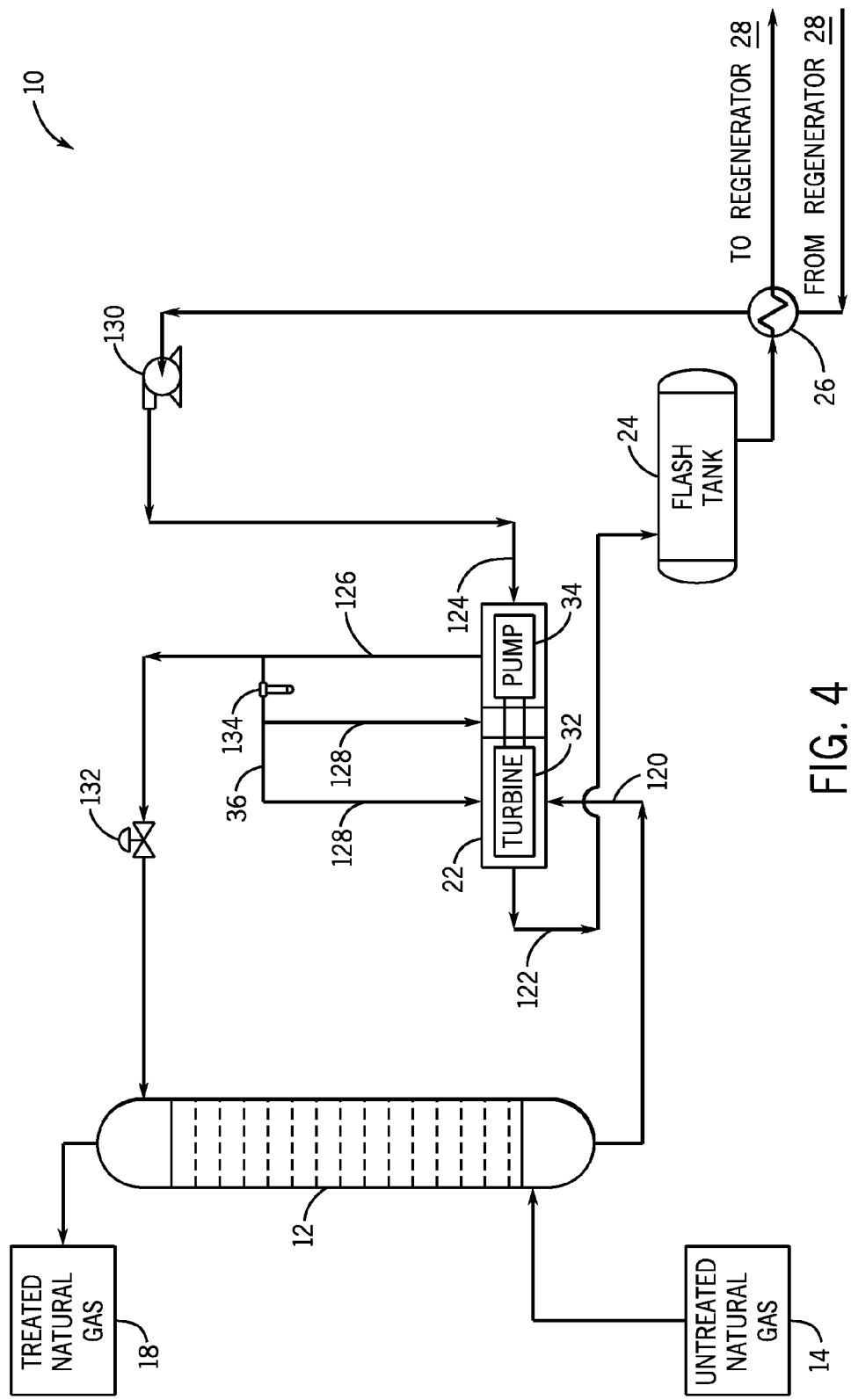
FIG. 4 is a schematic diagram of an embodiment of a gas processing system with a turbocharger where a process fluid exiting the turbocharger is used as a bearing lubricating fluid for the turbocharger, in accordance with an embodiment.

FIG. 4 is a diagram of an embodiment of the gas processing system 10 with the turbocharger 22 that receives a treated lean amine stream 16 as a bearing lubricant (e.g., the treated process fluid 36). As illustrated, there are five fluid connections to the turbocharger 22, namely a high pressure rich amine inlet 120, a low pressure rich amine outlet 122, a low pressure lean amine inlet 124, a high pressure lean amine outlet 126, and a high pressure, filtered lean amine bearing lubricant 128. As described above, the gas processing system 10 includes the contactor 12 that receives the untreated natural gas 14 and the lean amine stream 16 at high pressure and outputs the treated natural gas 18 and the rich amine stream 20 at high pressure. The rich amine stream 20 at high pressure is routed to the turbine 32 (e.g., the high pressure rich amine inlet 120), which outputs the rich amine stream 20 at low pressure (e.g., the low pressure rich amine outlet 122). The rich amine stream 20 at low pressure is then routed to the flash tank 24 (e.g., a flash drum), the rich/lean heat exchanger 26, and the regenerator 28. Further, as described above, acid gases 30 (e.g., sour gases) leave the rich amine stream 20 through the top of the regenerator 28, and the lean amine stream 16 exits the regenerator 28 at low pressure and is routed from the regenerator 28 to the rich/lean heat exchanger 26. In the illustrated embodiment, the lean amine stream 16 then passes through a pump 130, which is used to pressurize the lean amine stream 16 before the lean amine stream 16 enters the pump 34 of the turbocharger 22 (e.g., the lean amine stream inlet 124). As such, the pump 130 and the pump 34 in combination pressurize the lean amine stream 16 to the desired high pressure, such as a pressure approximately equal to that of the contactor 12 (e.g., up to approximately 6,895 kPa, 7,585 kPa, or 8,270 kPa). In certain embodiments, the pump 130 may pressurize the lean amine stream 16 to between approximately 5 percent and 95 percent, 10 percent and 85 percent, 15 percent and 75 percent, 20 percent and 65 percent, or 30 percent and 55 percent of the desired high pressure. In one embodiment, the pump 130 may pressurize the lean amine stream 16 to approximately 35 percent of the desired high pressure. In some embodiments, the pump 34 may pressurize the lean amine stream 16 to between approximately 5 percent and 95 percent, 15 percent and 90 percent, 25 percent and 85 percent, 35 percent and 80 percent, or 40 percent and 75 percent of the desired high pressure. In one embodiment, the pump 34 may pressurize the lean amine stream 16 to approximately 65 percent of the desired high pressure. The lean amine stream 16 leaves turbocharger 22 at high pressure (e.g., the high pressure lean amine outlet 126) and is fed to the top of the contactor 12 through a flow control valve 132.

Additionally, a portion of the high pressure lean amine outlet 126 may be routed to a filter 134, which may output the treated, high pressure lean amine bearing lubricant 128. The filter 134 may be a mechanical filter (e.g., a cartridge filter or a precoat filter) configured to remove particulates and/or a carbon filter configured to remove certain chemical constituents (e.g., entrained hydrocarbons or surface-active compounds). It should be appreciated that in other embodiments alternative or additional treatment steps may be implemented to generate the treated, high pressure lean amine bearing lubricant 128. For example, in some embodiments, a portion of the high pressure lean amine outlet 126 may be exposed to radiation (e.g., ultraviolet, heat, electromagnetic, microwave, x-ray, gamma, etc.), may be provided to an ion exchange column, or may be pH balanced. Further, it should be noted that the location of the filter 134 in the gas processing system 10 may vary. For example, in other embodiments, the filter 134 may be located between the pump 130 and the turbocharger 22, between the rich/lean heat exchanger 26 and the pump 130, or in any other suitable location. Additionally, it should be noted that in some embodiments, the high pressure lean amine outlet 126 may be generally free of particulates and may not be filtered. In such embodiments, the high pressure lean amine outlet 126 may be used as the treated, high pressure lean amine bearing lubricant 128.

The treated, high pressure lean amine bearing lubricant 128 may be provided to one or more bearings of the turbocharger 22. However, in other embodiments, the gas processing system 10 may include two or more independent flow paths routing the lean amine bearing lubricant 128 to each bearing or component of the turbocharger 22 to be cooled and lubricated. In particular, the treated, high pressure lean amine bearing lubricant 128 may enter the turbocharger 22 through the bearing lubricant inlet 60. In certain embodiments, the bearing lubricant inlet 60 and the passageway 98 may direct the treated, high pressure lean amine bearing lubricant 128 to the thrust bearing 94, the touchdown bearing 96, and the dynamic shaft seal of the turbocharger for lubrication and cooling.

Treating the high pressure lean amine outlet 126 to generate the treated, high pressure lean amine bearing lubricant 128 may be desirable because the high pressure lean amine outlet 126 may already be pressurized to the turbocharger pressure. However, in other embodiments, the treated, high pressure lean amine bearing lubricant 128 may be pressurized using an additional pump before the treated, high pressure lean amine bearing lubricant 128 is routed to the bearing lubricant inlet 60. Additionally, in other embodiments, a process stream, such as a slip stream (e.g., from the lean amine stream 16 or the rich amine stream 20), a make-up water stream, or a condensate reflux stream may be used, which may not be at the turbocharger pressure. In such embodiments, the process stream may be pressurized with a pump and then provided to the turbocharger 22 as a bearing lubricant.

Figure 5:
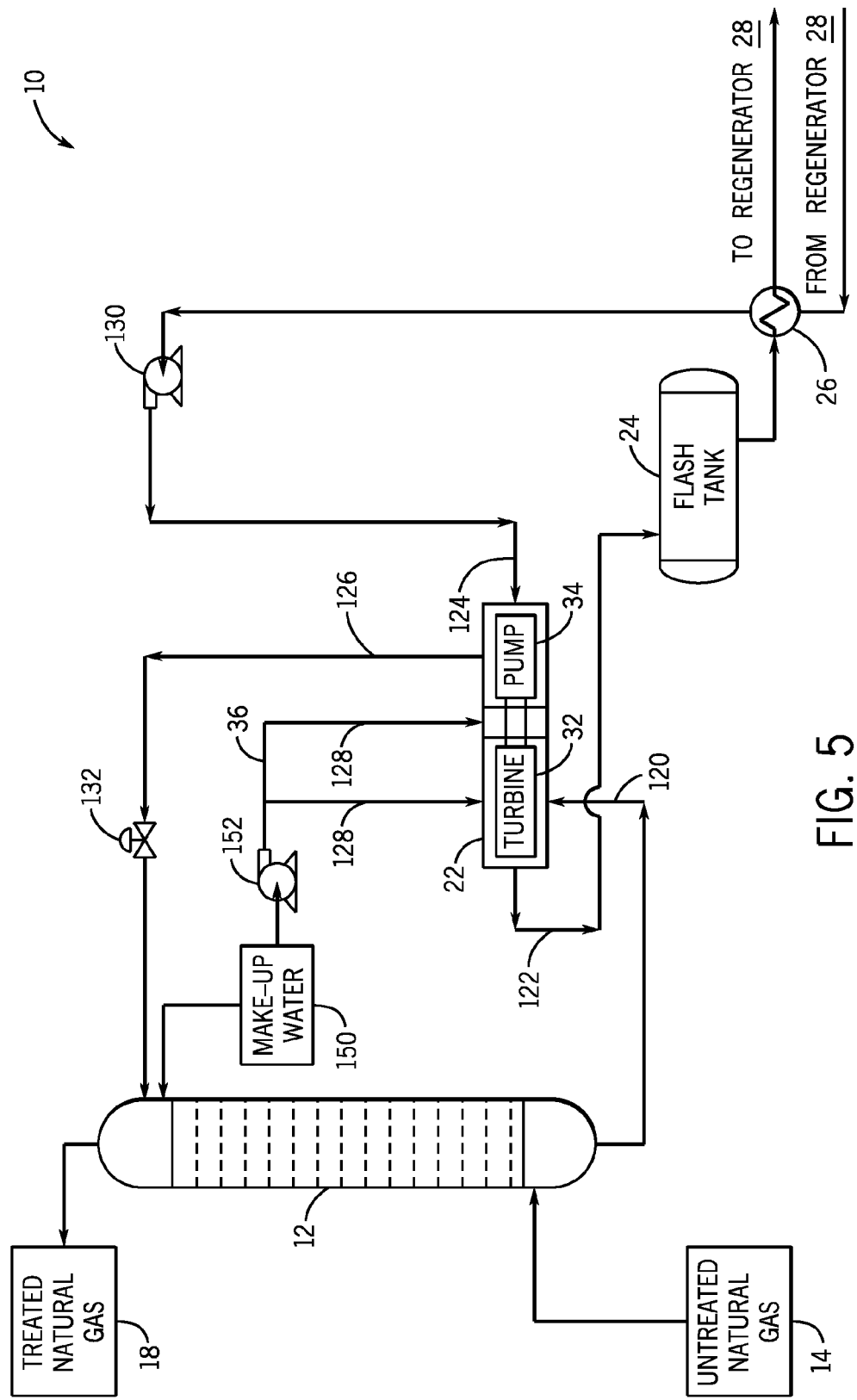
FIG. 5 is a schematic diagram of an embodiment of a gas processing system with a turbocharger (e.g., where make-up water is used as a bearing lubricating fluid for the turbocharger), in accordance with an embodiment.

For example, as illustrated in FIG. 5, a make-up water stream 150 may be provided to the turbocharger 22 as a bearing lubricant (e.g., the treated process fluid 36). In certain embodiments, the make-up water stream 150 may be provided to contactor 12 to compensate for water that is lost in the treated natural gas 18 leaving the contactor 12. As noted above, the make-up water stream 150 may be treated (e.g., demineralized). However, the make-up water stream 150 may also be subjected to any other suitable treatment step. As illustrated, the make-up water stream 150 is also provided to the turbocharger 22 (e.g., to the thrust bearing 94, the touchdown bearing 96, and the dynamic shaft seal of the turbocharger 22) for lubrication and cooling. In certain embodiments, the make-up water stream 150 may not be pressurized to a desired pressure (e.g., the turbocharger pressure). Accordingly, the gas processing system 10 may include a pump 152 (e.g., a reciprocating pump, a positive displacement pump, or a high pressure pump) to pressurize the make-up water stream 150 before the make-up water stream 150 is provided to the turbocharger 22. It should be appreciated that in certain embodiments, the gas processing system 10 may include two or more independent flow paths routing the make-up water stream 150 to each bearing or component of the turbocharger 22 to be cooled and lubricated.

Figure 6:
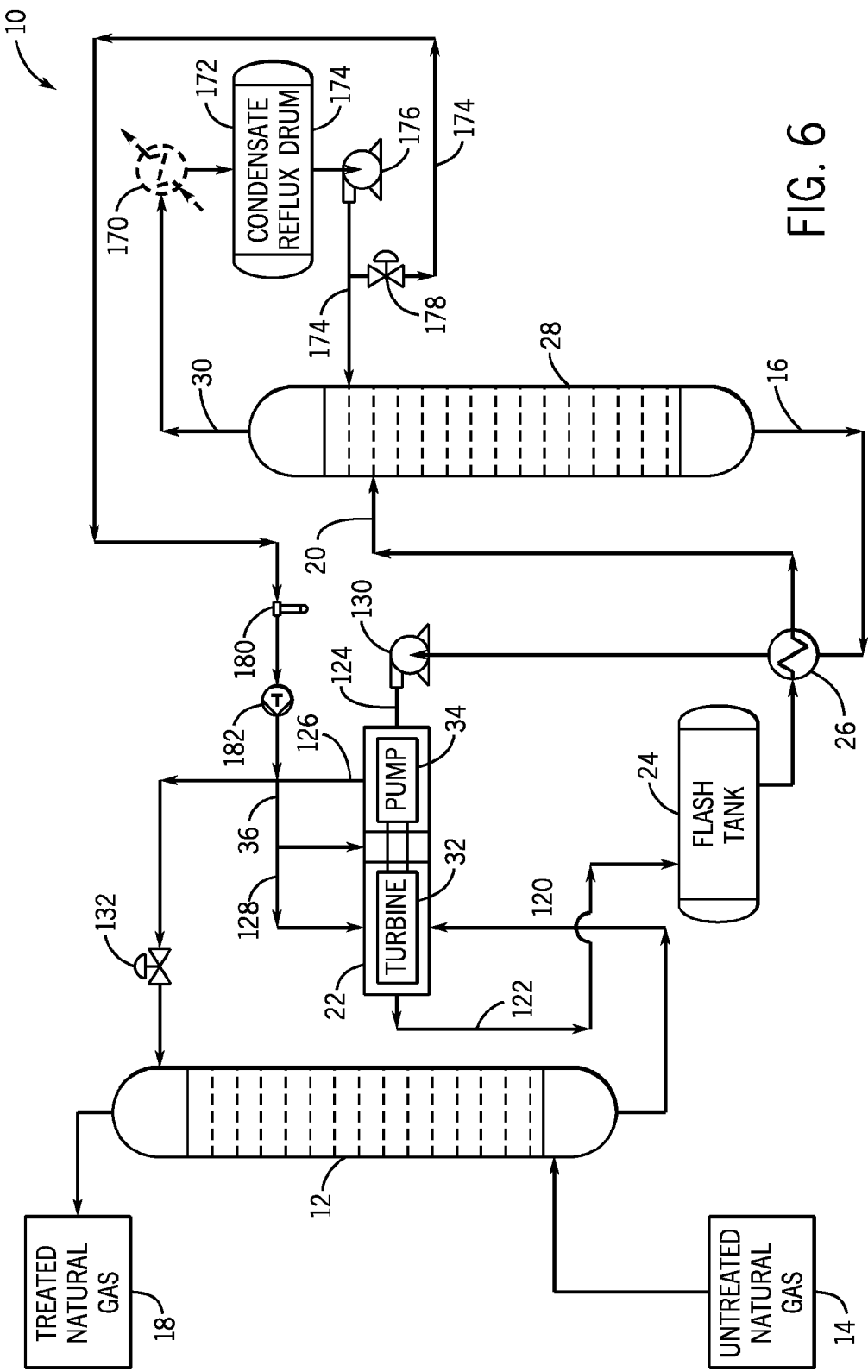
FIG. 6 is a schematic diagram of an embodiment of a gas processing system with a turbocharger (e.g., where condensate reflux is used as a bearing lubricating fluid for the turbocharger), in accordance with an embodiment.

FIG. 6 illustrates an embodiment of the gas processing system 10 including the turbocharger 22 that is configured to receive condensate reflux as a bearing lubricant (e.g., the treated process fluid 36). As illustrated, the rich amine stream 20 is routed to the top of the regenerator 28. The regenerator 28 heats the rich amine stream 20, which releases the acid gases from the amine fluid, and the regenerator 28 discharges the lean amine stream 16 through the bottom and the acid gas 30 with steam through the top. The steam and acid gas 30 enters a reflux condenser 170, wherein the steam is condensed (e.g., reflux condensate), separated from the acid gas 30 in a condensate reflux drum 172, and a reflux condensate stream 174 is pumped back to the regenerator 28 via a pump 176. The acid gases 30 may leave the condensate reflux drum 172. It should be appreciated that in certain embodiments, the gas processing system 10 may include two or more independent flow paths routing the condensate reflux stream 174 to each bearing or component of the turbocharger 22 to be cooled and lubricated.

Additionally, a portion of the reflux condensate stream 174 may be routed via control valve 178 to the turbocharger 22 to lubricate and cool the turbocharger 22. In some embodiments, the reflux condensate stream 174 may be treated and pressurized before being routed to the turbocharger 22. For example, in some embodiments, the reflux condensate stream 174 may be filtered via a filter 180, which may be a mechanical filter and/or a carbon filter. However, the reflux condensate stream 174 may be subjected to any other suitable treatment steps, such as the treatment steps described above. Additionally, the reflux condensate stream 174 may be pressurized to a desired pressure (e.g., a pressure of the turbocharger 22) via a pump 182 (e.g., a reciprocating pump, a positive displacement pump, or a high pressure pump). Further, as noted above, the reflux condensate stream 174 may be provided to the thrust bearing 94, the touchdown bearing 96, and the dynamic shaft seal of the turbocharger 22 for lubrication and cooling.

Figure 7:
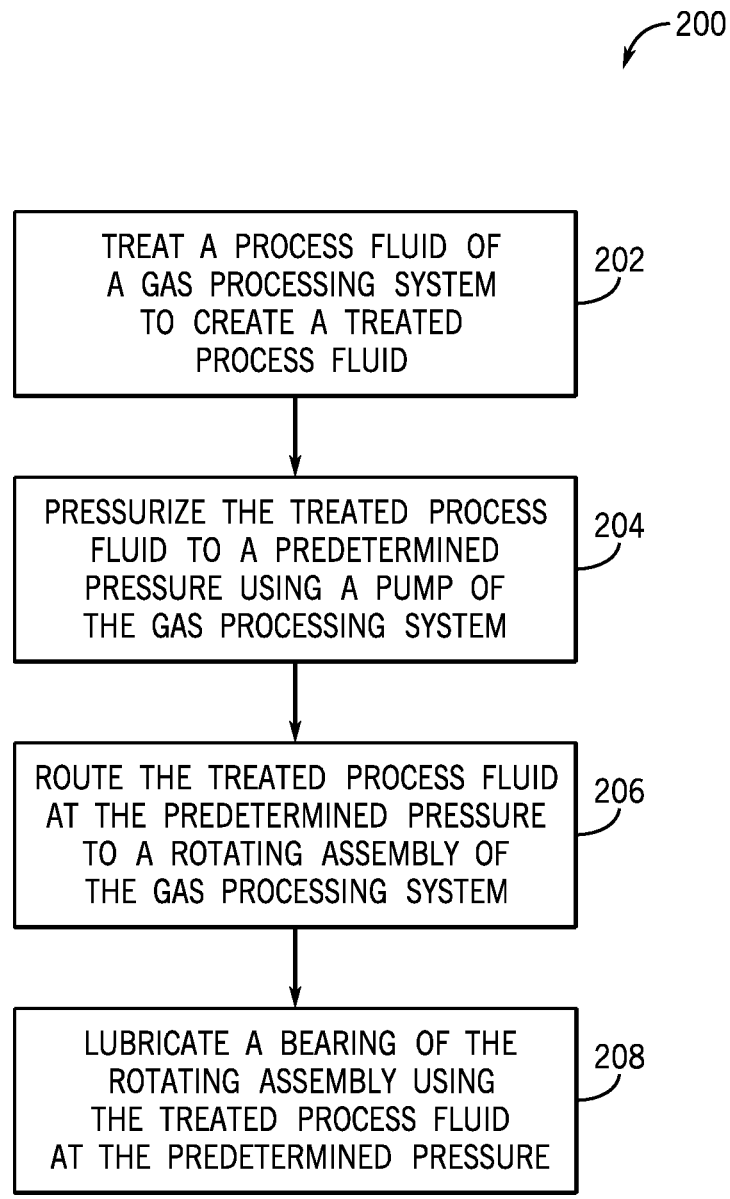
FIG. 7 is a flow diagram of a method for lubricating a bearing of a rotating assembly.

The present embodiments also include methods for providing the treated process fluid 36 to the turbocharger 22. For example, FIG. 7 illustrates a method 200 for lubricating and cooling a rotating assembly (e.g., the turbocharger 22) using a treated process fluid (e.g., the treated process fluid 36) of a gas processing system (e.g., the gas processing system 10). The method 200 may include treating a process fluid of a gas processing system to create a treated process fluid (e.g., the treated process fluid 36) (block 202). As described above, treating the process fluid to create the treated process fluid may include filtering the process fluid to remove particulates and/or chemical contaminants (e.g., entrained hydrocarbons or surface-active compounds), exposing the process fluid to radiation (e.g., to kill bacteria), demineralization, providing the process fluid to an ion exchange column to remove certain ions, condensing the process flow, and/or pH balancing. Further, the process fluid may include one or more slip-streams, make-up water, condensate reflux, and/or replacement solvent.

The method 200 may also include pressurizing the treated process fluid to a predetermined pressure using a pump of the gas processing system (block 204). In particular, the treated process fluid may be pressurized to a pressure of the rotating assembly (e.g., the turbocharger 22). For example, in some embodiments, the treated process fluid may be pressurized to within approximately 1%, 2%, 3%, 4%, 5%, 6%, 7%, 8%, 9%, or 10% of the turbocharger pressure. However, in some embodiments, the treated process fluid may be at the predetermined pressure and may not be pressurized using the pump. For example, in embodiments in which the lean amine stream exiting the pump 34 of the turbocharger is used as the treated process fluid 36, the lean amine stream may already be at the turbocharger pressure and may not be pressurized using an additional pump.

Further, the method 200 may include routing the treated process fluid at the predetermined pressure to a rotating assembly of the gas processing system (block 206). For example, the treated process fluid may be routed to a bearing lubricant inlet 60 of the turbocharger. Additionally, the method 200 includes lubricating a bearing of the rotating assembly using the treated process fluid at the predetermined pressure (block 208). For example, the treated process fluid may be used to lubricate the thrust bearing 94 and the touchdown bearing 96 of the turbocharger 22.

As described above, certain embodiments of the gas processing system 10 may include the contactor 12 to remove the acid gas 30 from the untreated natural gas 14 using an amine in the lean amine stream 16, thereby generating the treated natural gas 18 and the rich amine stream 20. The gas processing system 10 may also include the regenerator 28 to regenerate the amine in the rich amine stream 20, thereby generating the lean amine stream 16 and the acid gas 30. The gas processing system 10 may also include the turbocharger 22 to transfer the rich amine stream 20 from the contactor 12 to the regenerator 28 and to transfer the lean amine 16 from the regenerator 28 to the contactor 12. The turbocharger 22 includes the turbine 32 configured to reduce the pressure of the rich amine stream 18 and the pump 34 configured to increase the pressure of the lean amine stream 16. The turbine 32 may be configured to power the pump 34. Thus, use of the turbocharger 22 may reduce the amount of energy expended in pressurizing the amine solution in the system 10, thereby reducing the operating costs of the gas processing system 10.

In addition, the gas processing system 10 may include various sources of process fluid that may be used to cool and lubricate bearings and dynamic shaft seals of the turbocharger 22. In certain embodiments, the gas processing system 10 may include one or more filters or other treatment devices, such as a source of radiation, an ion exchange column, and/or a pH balancing system, to treat the process fluid to generate the treated process fluid 36. Use of the treated process fluid 36 may reduce the cost and complexity of lubricating the turbocharger 22 as compared to an oil lubrication system. In particular, the treated process fluid 36 may be treated to remove abrasive particulates and/or certain chemical constituents that may cause wear to the turbocharger 22. As such, use of the treated process fluid 36 may reduce wear of the turbocharger 22 as compared to utilizing non-treated process fluids to lubricate and cool the turbocharger 22. Thus, the treated process fluid 36 may increase the lifetime of the turbocharger 22, reduce costs and downtown associated with repairing and/or replacing the turbocharger 22, reduce capital costs associated with the gas processing system 10, and/or increase the profitability of the gas processing system 10.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method, comprising:
    treating a process fluid of a gas processing system to create a treated process fluid, wherein the gas processing system comprises a turbocharger comprising a turbine portion and a pump portion, the turbine portion comprising an inlet configured to receive a first fluid at a first high pressure and an outlet configured to output the first fluid at a first low pressure, the pump portion comprising an inlet configured to receive a second fluid at a second low pressure and an outlet configured to output the second fluid at a second high pressure, wherein rotation of the turbine portion powers the pump portion, and the process fluid comprises the second fluid;

pressurizing the treated process fluid to a predetermined pressure using a pump of the gas processing system;

routing the treated process fluid at the predetermined pressure to a bearing lubricant inlet of the turbocharger; and lubricating a bearing of the turbocharger using the treated process fluid at the predetermined pressure.

2. The method of claim 1, wherein treating the process fluid comprises filtering the process fluid to remove particulates.

3. The method of claim 1, wherein treating the process fluid comprises filtering the process fluid to remove selected chemical constituents.

4. The method of claim 1, wherein treating the process fluid comprises pH balancing the process fluid, exposing the process fluid to radiation, or removing selected ions of the process fluid using an ion absorber column.

5. The method of claim 1, wherein the process fluid comprises condensate reflux.

6. The method of claim 1, wherein the process fluid comprises make-up water.

7. The method of claim 1, wherein the process fluid comprises a slip-stream from the gas processing system.

8. The method of claim 1, wherein the rotating assembly comprises a turbocharger comprising a turbine section and a pump section.

9. The method of claim 1, wherein pressurizing the treated process fluid to the predetermined pressure comprises pressurizing the treated process fluid to a pressure of the turbocharger.

10. The method of claim 8, wherein routing the treated process fluid at the predetermined pressure to the rotating assembly comprises routing the treated process fluid at the predetermined pressure to a bearing lubricant inlet of the turbocharger.

11. A system, comprising:
a gas processing system comprising:
a turbocharger comprising:
a turbine portion comprising an inlet configured to receive a first fluid at a first high pressure and an outlet configured to output the first fluid at a first low pressure;
a pump portion comprising an inlet configured to receive a second fluid at a second low pressure and an outlet configured to output the second fluid at a second high pressure, wherein rotation of the turbine portion is configured to power the pump portion;
at least one bearing configured to support at least one component of the turbocharger; and
a bearing lubricant inlet configured to receive a lubricating fluid for lubricating the at least one bearing; and
a filter configured to receive a process fluid of the gas processing system, filter the process fluid, and output a filtered process fluid, wherein the process fluid comprises the second fluid; and a pump configured to pressurize the filtered process fluid to a predetermined pressure and to route the filtered process fluid at the predetermined pressure to the bearing lubricant inlet of the turbocharger, wherein the filtered process fluid is configured to lubricate the at least one bearing.

12. The system of claim 11, wherein the filter is configured to remove particulates or chemical constituents from the process fluid.

13. The system of claim 11, wherein the at least one bearing of the turbocharger comprises a thrust bearing and a touchdown bearing, and wherein the thrust bearing and the touchdown bearing are configured to support a turbine runner of the turbine portion.

14. The system of claim 11, wherein the gas processing system comprises an amine gas processing system, comprising:
a contactor configured to remove an acid gas from an untreated natural gas using an amine in a lean amine stream, output a treated natural gas, and output a rich amine stream; and
a regenerator configured to regenerate the amine in the rich amine stream, output the lean amine stream, and output the acid gas;
wherein the first fluid comprises the rich amine stream and the second fluid comprises the lean amine stream.

15. The system of claim 14, wherein the process fluid comprises the lean amine stream.

16. The system of claim 14, comprising:
a condenser configured to receive the acid gas and steam from the regenerator and to condense the steam; and
a condensate reflux drum configured to separate the condensed steam from the acid gas and to output a condensate reflux stream comprising the condensed steam;
wherein the process fluid comprises the condensate reflux stream.

17. A system, comprising:
an amine gas processing system, comprising:
a contactor configured to remove an acid gas from an untreated natural gas using an amine in a lean amine stream, output a treated natural gas, and output a rich amine stream;
a regenerator configured to regenerate the amine in the rich amine stream, output the lean amine stream, and output the acid gas;
a turbocharger comprising:
a turbine portion comprising an inlet configured to receive the rich amine stream at a first high pressure and an outlet configured to output the rich amine stream at a first low pressure;
a pump portion comprising an inlet configured to receive the lean amine stream at a second low pressure and an outlet configured to output the lean amine stream at a second high pressure, wherein rotation of the turbine portion is configured to power the pump portion;
a bearing configured to support at least one component of the turbocharger; and
a bearing lubricant inlet configured to receive a lubricating fluid for lubricating the bearing;
a condenser configured to receive the acid gas and steam from the regenerator and to condense the steam to generate a condensate reflux stream comprising the steam; and
a pump configured to transfer the condensate reflux stream to the bearing lubricant inlet, wherein the condensate reflux stream is configured to lubricate the bearing of the turbocharger.

18. The system of claim 17, comprising a filter configured to remove particulates or chemical constituents from the condensate reflux stream and to output a treated condensate reflux stream, and wherein the pump is configured to transfer the treated condensate reflux stream to the bearing lubricant inlet.

19. The system of claim 17, comprising:
a second filter configured to receive the lean amine stream at the second low pressure from the pump portion and to filter the lean amine stream at the second low pressure to output a treated lean amine stream; and
a second pump configured to pressurize the treated lean amine stream to a predetermined pressure and to route the treated lean amine stream at the predetermined pressure to the bearing lubricant inlet of the turbocharger, wherein the treated lean amine stream is configured to lubricate the bearing of the turbocharger.

* * * * *